United States Patent [19]

Kato

[11] Patent Number: 5,049,414

[45] Date of Patent: Sep. 17, 1991

[54] ANTIREFLECTION SOLUTION FOR OPTICAL PARTS AND METHOD FOR ANTIREFLECTION TREATMENT USING SAID SOLUTION

[75] Inventor: Hirohisa Kato, Aichi, Japan

[73] Assignee: Ito Optical Industrial Co., Ltd., Aichi, Japan

[21] Appl. No.: 399,556

[22] PCT Filed: Oct. 24, 1987

[86] PCT No.: PCT/JP87/00819

§ 371 Date: Jun. 21, 1989

§ 102(e) Date: Jun. 21, 1989

[87] PCT Pub. No.: WO89/04004

PCT Pub. Date: May 5, 1989

[51] Int. Cl.$^5$ .............................................. B05D 5/06
[52] U.S. Cl. ............................ 427/164; 106/287.14; 106/287.16; 427/165; 427/169; 427/317; 427/402; 427/407.2; 427/412.1
[58] Field of Search ............... 427/164, 168, 165, 226, 427/169, 387, 412.1, 407.2, 402; 106/287.16, 287.14

[56] References Cited

U.S. PATENT DOCUMENTS

| | | | |
|---|---|---|---|
| 4,211,823 | 7/1980 | Suzuki et al. | 427/164 |
| 4,272,588 | 6/1981 | Yoldas | 427/164 |
| 4,361,598 | 11/1982 | Yoldas et al. | 427/164 |
| 4,374,158 | 2/1983 | Taniguchi et al. | 427/164 |
| 4,547,397 | 10/1985 | Burzynski et al. | 427/164 |
| 4,551,361 | 11/1985 | Burzynski et al. | 427/164 |

*Primary Examiner*—Janyce Bell
*Attorney, Agent, or Firm*—Armstrong, Nikaido, Marmelstein, Kubovcik

[57] ABSTRACT

This invention is directed to an antireflection solution having as a main film-forming component thereof a hydrolytic derivative of a silicic ester and to a method for the treatment with the antireflection solution. The antireflection solution and the method for the treatment therewith are characterized by the fact that the hydrolytic derivative of silicic ester is obtained by causing a mixture consisting of the silicic ester and hydrolyzing water added thereto in an amount exceeding the chemical equivalent relative to the silicic ester to be hydrolyzed in the presence of a solvent compatible with both of the components of the mixture and further subjecting the resultant hydrolyzate to conversion into a colloid solution under the condition of pH 3 to 7. Owing to the characteristics mentioned above, the present invention permits the antireflection film produced by thermally solidifying an applied layer of the antireflection solution at a low temperature in the neighborhood of 100° C. to acquire notable improvement in film properties such as resistance to defilement and adhesiveness to the substrate.

5 Claims, 1 Drawing Sheet

ANTIREFLECTION SOLUTION FOR OPTICAL PARTS AND METHOD FOR ANTIREFLECTION TREATMENT USING SAID SOLUTION

BACKGROUND OF THE INVENTION

Heretofore, the antireflection treatment of optical parts has been mainly carried out by a method which comprises depositing an inorganic substance (such as metal oxide or fluoride) in the form of a film on the surface of a given optical part by the so-called dry plating technique such as vacuum deposition, spattering, or ion plating.

Since the method of this nature requires the treatment to be carried out under a vacuum, it imposes a limit on the size of the substrate and suffers the treatment to become expensive. By this reason, the optical parts which are now benefiting from the antireflection treatment are limited to relatively expensive products of high added value. Virtually all general-purpose products of quantity manufacture are not given this treatment.

For the optical parts using inorganic glass substrates, therefore, a method which comprises etching the surface of a given glass substrate with an aqueous solution of hydrosilicofluoric acid or hydrofluoric acid supersaturated with silica as disclosed in U.S. Pat. No. 2,490,662 and U.S. Pat. No. 4,535,026 and a method which comprises superposing a multicomponent glass layer on the surface of a given substrate through a sol-gel process and etching the glass layer with hydrofluoric acid as disclosed in U.S. Pat. No. 4,273,826 have been proposed. In Japanese Utility Model Publication SHO 50(1975)-26,277 discloses a method which produces a braun possessing an antireflection effect by spraying silicon tetrachloride on the surface of a Braun tube and thermally setting the deposited layer of silicon tetrachloride thereby giving rise to very minute silica particles.

These methods permit the antireflection treatment to be carried out inexpensively. They, however, have a disadvantage that they are incapable of giving an effective antireflection treatment to plastic substrates and the antireflection films produced thereby are inferior in strength of film and density of film, namely in wear resistance and scratch resistance, to those produced by the dry plating methods mentioned above, and they are liable to be defiled when they are handled with bare hands.

On plastic substrates, the antireflection treatment can be effectively carried out by (1) the film superposition method by means of wet immersion (based on the same principle as the aforementioned dry plating method) as disclosed in Japanese Patent Publication SHO 58(1983)-46,301 and SHO 59(1984)-49,501 and (2) the so-called coating method which makes use of a treating solution containing colloid particles such that, when the solution is applied in the form of a film on the surface of a given substrate, the colloid particles give rise to fine irregularities on the surface as disclosed in Japanese Patent Application Disclosure SHO 58(1983)-126,502, for example.

In the case of the method of (1) mentioned above, uniform superposition of the film in two or three layers by means of immersion (including the control of film is extremely difficult to achieve where the given substrate has a large size or involves a large curvature. The method, therefore, the liable to entail a problem of production control. The inventor, therefore, has found a special interest in the method of (2) which permits easy production control.

The colloid particles involved in the method of (2) are generally formed mainly of the hydrolyzate (including polycondensate) of a silicic ester. Since the colloid particles of a fixed diameter are sporadically deposited on the coated surface, they manifest their function as an antireflection medium by lowering the apparent refractive index of the glass substrate. This method, however, has been found to entail a disadvantage that since mutual polymerization of individual colloid particles does not readily proceed at the specified low temperature (80° to 130° C.), the produced film possesses low strength, tends to collect dirt (because of surface irregularities), and betrays poor adhesion to the substrate as compared with the film produced by the aforementioned dry plating method.

DISCLOSURE OF THE INVENTION

For the purpose of solving the drawbacks indicated above, the antireflection solution for optical parts and the method for antireflection treatment with the antireflection solution according to the present invention have the following constructions.

The antireflection solution of the present invention is of a type having as a main coating component thereof a hydrolytic derivative of a silicic ester and is characterized by the fact that the hydrolytic derivative of the silicic acid has been produced by subjecting a mixture of the silicic ester with hydrolyzing water added thereto in an amount exceeding the chemical equivalent thereof to hydrolysis in the presence of a solvent compatible with both the components of the mixture and further converting the resultant hydrolyzate into a colloid solution under the condition of pH 3 to 7. The method of antireflection treatment is characterized by the steps of applying the antireflection solution to a given glass substrate by immersion of the substrate in the solution and then thermally hardening the applied layer of the solution thereby forming an antireflection film.

Owing to these characteristics, the present invention permits production of an antireflection film notably improved in strength, resistance to defilement, and adhesiveness to the substrate simply by causing the applied layer of solution to be thermally hardened at a low temperature in the neighborhood of 100° C.

BEST MODE OF EMBODIMENT OF THE INVENTION

I. Preparation of antireflection solution

Figure 1:
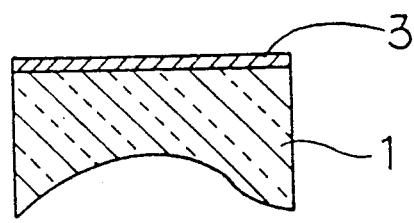
FIG. 1 is a cross section illustrating in schematic form a typical article which has undergone the antireflection treatment by the method of this invention.

1) Preparation of colloid solution (first component) from silicic ester

The silicic ester to be used herein has a composition represented by the following general formula (A):

$$Si(OR^1)_4 \qquad (A)$$

(wherein R¹ stands for an alkyl group, an alkoxylalkyl group or an acyl group each having 1 to 4 carbon atoms).

Concrete examples of the silicic ester answering the description include tetramethyl ortho-silicate, tetraethyl ortho-silicate, tetra-n-propyl ortho-silicate, tetra-i-propyl ortho-silicate, tetra-n-butyl ortho-silicate, and tetra-sec-butyl ortho-silicate.

1 Hydrolysis

A mixture obtained by adding 5 to 60 mols (preferably 20 to 50 mols) of hydrolyzing water to 1 mol of the aforementioned silicic ester (tetraalkoxy silane) is hydrolyzed (generally by the refluxing method for one to two hours) in the presence of a solvent compatible with both the components of the mixture. In terms of equivalent ratio, the mixture consists of 1 equivalent of the ester and 1.25 to 15 equivalent of the hydrolyzing water.

The hydrolyzing water used herein may be purified water. Since the hydrolysis of the present invention proceeds in the presence of an acid catalyst, an aqueous 0.1 to 1N hydrochloric acid solution is generally used as the hydrolyzing water. Examples of the solvent to be used for the hydrolysis include alcohols such as methyl alcohol, ethyl alcohol, isopropyl alcohol, and n-butyl alcohol, ketones such as acetone and methylethyl ketone, esters such as ethyl acetate and methyl acetate, and ethers such as diisopropyl ether and glycol ether. These solvents may be used either singly or in the form of a mixture of two or more members.

It is inferred that the hydrolysis of the silicic ester proceeds roughly as follows.

The alkoxy groups of the silicic ester are converted by the hydrolysis into silanol groups. Since the silanol groups possess extremely high reactivity, they undergo mutual condensation or condensation with alkoxy groups to give rise to siloxane bonds.

In the hydrolysis described above, if the amount of the hydrolyzing water is less than 5 mols, the colloid particles produced in the subsequent step (2) for conversion of the hydrolyzate into the colloid solution fail to acquire a diameter necessary for the purpose of antireflection. If the amount exceeds 60 mols, the produced antireflection film is deficient in thickness and liable to entail a phenomenon that the film surface causes random reflection of light and the film opacifies itself with a whitish color. Further, the antireflection solution itself suffers from a short shelf life.

When tetraethyl ortho-silicate is used as a silicic ester, the system for the hydrolysis comprises 1 part by weight of the silicic ester, 0.5 to 5 parts by weight (preferably 2 to 4 parts by weight) of the hydrolyzing water, and 10 to 94 parts by weight of the solvent.

2 Conversion into colloid solution

After completion of the hydrolysis, the reaction solution is adjusted to pH 3 to 7 and refluxed continuously until colloid particles of a specified diameter are obtained (generally for five to 20 hours). The refluxing time increases with the decreasing pH value and decreases with the increasing pH value. Thus, the refluxing time required for the production of the colloid solution necessary for this invention is inversely proportional to the pH value.

Generally the reaction solution resulting from the hydrolysis has a pH value in the range of 1.5 to 2.5 and, therefore, is subjected to pH adjustment by the addition of aqua ammonia, for example.

If the pH value of the solution is less than 3, it produces the colloid particles with difficulty. If the pH value exceeds 7, the solution abruptly loses stability and undergoes gelation. Thus, the pH adjustment must be carried out strictly. The colloid solution prepared as described above are assumed to be a mixed solution of a silanol group-containing silicon compound, a siloxane-containing silicon compound, and colloid (such as to be hardened thoroughly at a low temperature and vested with nobably improved adhesiveness of film as compared with the colloidal silica used alone).

2) Addition of hydrolyzate of specific silicon compound (second component) and colloidal silica (third component)

To the colloid solution (first component) prepared in 1) above, either or both of the following second and third components are added.

The second component is a hydrolyzate of a silicon compound represented by the following general formula (B). It is added for the purpose of further improving the properties (film strength, adhesiveness, and resistance to defilement) of the antireflection film.

(wherein R¹ stands for an alkyl group of 1 to 6 carbon atoms, a vinyl group, an epoxy group, a methacryloxy group, or a phenyl group, R² for an alkyl group of 1 to 6 carbon atoms or a halogenated alkyl group, R³ for an alkyl group of 1 to 4 carbon atoms, an alkoxyalkyl group, or an acyl group, and a and b each stand for 0, 1, or 2, providing that a+b is 1, 2, or 3).

As concrete examples of the silicon compound represented by the general formula (B), the following compounds can be cited.

γ-Glycidoxypropyltrimethoxy silane, γ-methacryoxypropyltrimethoxy silane, vinyltrimethoxy silane, methyltrimethoxy silane, methyltriethoxy silane, methyltrimethoxyethoxy silane, methyltriacetoxy silane, methyltributoxy silane, methyltripropoxy silane, glycidoxymethyltrimethoxy silane, glycidoxymethyltriethoxy silane, α-glycidoxyethyltrimethoxy silane, α-glycidoxyethyltriethoxy silane, β-glycidoxyethyltrimethoxy silane, β-glycidoxyethyltriethoxy silane, α-glycidoxypropyltrimethoxy silane, α-glycidoxypropyltriethoxy silane, β-glycidoxypropyltrimethoxy silane, β-glycidoxypropyltriethoxy silane, γ-glycidoxypropyltrimethoxy silane, γ-glycidoxypropyltriethoxy silane, γ-glycidoxypropyltripropoxy silane, γ-glycidoxypropyltributoxy silane, γ-glycidoxypropyltrimethoxyethoxy silane, γ-glycidoxypropyltriphenoxy silane, α-glycidoxybutyltrimethoxy silane, α-glycidoxybutyltriethoxy silane, β-glycidoxybutyltrimethoxy silane, β-glycidoxybutyltriethoxy silane, γ-glycidoxybutyltrimethoxy silane, γ-glycidoxybutyltriethoxy silane, δ-glycidoxybutyltrimethoxy silane, δ-glycidoxybutyltriethoxy silane, (3,4-epoxycyclohexyl)methyltrimethoxy silane, (3,4-epoxycyclohexyl)methyltriethoxy silane, β-(3,4-epoxycyclohexyl)ethyltrimethoxy silane, β-(3,4-epoxycyclohexyl)ethyltriethoxy silane, β-(3,4-epoxycyclohexyl)ethyltributoxy silane, β-(3,4-epoxycyclohexyl)ethyltributoxy silane, β-(3,4-epoxycyclohexyl)ethyltrimethoxyethoxy silane, β-(3,4-epoxycyclohexyl)ethyltriphenoxy silane, γ-(3,4-epoxycyclohexyl)propyltrimethoxy silane, γ-(3,4-epoxycyclohexyl)propyltriethoxy silane, δ-(3,4-epoxycyclohexyl)butyltrimethoxy silane, δ-(3,4-epoxycyclohexyl)butyltriethoxy silane, glycidoxymethylmethyldimethoxy silane, glycidoxymethylmethyldiethoxy silane, α-glycidoxyethylmethyldimethoxy silane, α-glycidoxyethylmethyldiethoxy silane, β-glycidoxyethylmethyldimethoxy silane, β-glycidoxyethylmethyldiethoxy silane, α-glycidoxypropylmethyldimethoxy silane, α-glycidoxypropylmethyldiethoxy silane, β-glycidoxypropylmethyldiethoxy silane, γ-glycidoxypropylmethyldiethoxy silane, γ-glycidoxypropylmethyldipropoxy silane, γ-glycidoxypropylmethyldibutoxy silane, γ-glycidoxypropylmethyldimethoxyethoxy silane, γ-glycidoxypropylmethyldiphenoxy silane, γ-glycidoxypropylethyldimethoxy silane, γ-glycidoxypropylethyldiethoxy silane, γ-glycidoxypropylbinyldimethoxy silane, γ-glycidoxypropylvinyldiethoxy silane, γ-glycidoxypropylphenyldimethoxy silane, γ-glycidoxypropylphenyldiethoxy silane, ethyltrimethoxy silane, ethyltriethoxy silane, vinyltrimethoxy silane, vinyltriethoxy silane, vinyltriacetoxy silane, vinyltrimethoxyethoxy silane, phenyltriethoxy silane, phenyltriacetoxy silane, γ-chloropropyltrimethoxy silane, γ-chloropropyltriethoxy silane, γ-chloropropyltriacetoxy silane, γ-methacryloxypropyltrimethoxy silane, chloromethyltrimethoxy silane, chloromethyltriethoxy silane, dimethyldimethoxy silane, phenylmethyldimethoxy silane, dimethyldiethoxy silane, phenylmethyldiethoxy silane, γ-chloropropylmethyldimethoxy silane, γ-chlorcpropylmethyldietoxy silane, dimethyldiacetoxy silane, γ-methacryloxypropylmethyldimethoxy silane, γ-methacryloxypropylmethyldiethoxy silane, methylvinyldimethoxy silane, and methylvinyldiethoxy silane. The selection of the particular silicon compound from the group of silicon compounds enumerated above depends on the kind of substrate and the kind of hard coat on the substrate.

The third component is colloidal silica and it is added suitably for the purpose of enhancing the strength of the film produced after the antireflection treatment. The term "colloidal silica" as used herein means stable silica sol which is generally desired to possess a $SiO_2$ concentration in the range of 10 to 30% and a particle diameter in the range of 10 to 100 μm.

The total amount of the second and third components to be added to the first component, when compared in solids content, is roughly not more than the amount of the first component.

3) Preparation of antireflection solution

The solution prepared in 2) above generally has too high viscosity to be applied efficiently to a given substrate. It is, therefore, subjected to final preparation by the addition of solvent and surfactant necessary for acquisition of viscosity, specific gravity, and wettability suitable for the shape and size of the substrate and further by the addition of a catalyst necessary for enhancement of the hardening speed of the applied layer of the solution.

Generally, the film-forming component (solids) of the antireflection solution is in the range of 0.5 to 5% by weight.

The solvent suitably used for the final preparation is an alcohol type low-boiling compound Isopropyl alcohol, ethyl cellosolve, and methyl alcohol are preferred but unexclusive examples of the solvent.

Examples of the surfactant used for the final preparation include nonionic silicone type surfactants, block and graft copolymers of dimethyl siloxane and alkylene oxides, and nonionic fluorine type surfactants.

As example of the catalyst for use in the final preparation, the following catalysts similar to silicone type condensate catalysts can be cited.

1 Acids

Phosphoric acid, hydrochloric acid, sulfuric acid, acetic acid, acrylic acid, tartaric acid, oxalic acid, maleic acid, gallic acid, and citric acid.

2 ) Bases

3 Carbonates

Sodium carbonate, potassium carbonate, and ammonium carbonate.

4 Borofluorides

Sodium borofluoride, potassium borofluoride, and ammonium borofluoride.

5 Organic metal salts

Tin octylate, tin laurate, dibutyl tin diacetate, dibutyl tin laurate, and dibutyl tin diacetate.

6 Organic carboxylic acids

Acetic acid, naphthenic acid, caprylic acid, benzoic acid, salicylic and stearylic acid.

7 Organic polycarboxylic acids

Maleic acid, maleic anhydride, fumaric acid, itaconic acid, itaconic anhydride, citraconic acid, tetrahydrophthalic acid, acid, chloromaleic acid, acid, trimellitic acid, trimellitic anhydride, pyromellitic acid, and pyromellitic anhydride.

8 Organic carboxylic acids and polycarboxylates

9 Amines, tertiary amines, and quaternary amines

Dicyandiamide and imidazole compounds.

10 Acetylacetone metal salts

Metal salts of zinc, cobalt, iron, chromium, and aluminum.

11 Titanates

Tetrapropyl titanate and tetrabutyl titanate.

12 Aluminyl alkoxides

II Method for use of antireflection solution:

1) On either or both of the surfaces of a transparent substrate of glass or plastic material, the antireflection solution prepared in I above is applied and thermally hardened (thermally polymerized) to produce an antireflection film.

As examples of the material for the transparent plastic substrate, polydiethylene glycol bisallyl carbonate (CR-39), polymethyl methacrylate (PMMA), and polycarbonate (PC) can be cited. Since the transparent plastic substrate is deficient in surface hardness and in resistance to scratches, it is desirable to have either or both of the surfaces furnished with a hard coating using at least one member selected from the group consisting of polysiloxane type compounds, acryl polymer type compounds, melamine type compounds, polyester type compounds, polyurethane type compounds, and derivatives thereof.

The application of the antireflection solution is effected by any of various forms of immersion such as, for example, the bath lowering method, the bath raising method, and the spin coating method. It may be effected by other method such as, for example, the spray coating method, the flow coating method, or the roll coating method. The antireflection solution is applied in an amount calculated to produce a dry layer of a thickness in the range of 0.1 to 0.7 μm.

The heating conditions for hardening the applied layer of the solution are mainly determined by the thermal stability of the substrate. Generally, the heating is effected at a temperature in the neighborhood of 100° C. in the case of a plastic substrate or in the neighborhood of 120° C. in the case of a glass substrate, for a period of one to two hours. 2) For the surface of the antireflection film formed on the substrate as described above to be improved in resistance to defilement, wear resistance, and waterproofness, it is desirable to subject the surface to a lubricating treatment which comprises applying to the surface a lubricity-imparting silicon compound represented by any of the general formulas (C), (D), and (E) and heating the applied layer thereby forming a film (20 to 100 ↑) incapable of degrading the effect of reflection attained in 1) above.

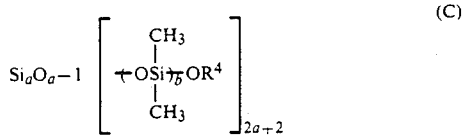

(wherein $R^4$ stands for an alkyl group of 1 to 4 carbon atoms, an alkoxyalkyl group, or an acyl group, a for an integer in the range of 1 to 4, and b for an integer in the range of 1 to 7).

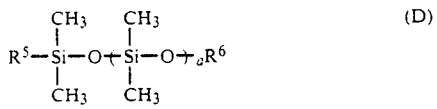

(wherein $R^5$ and $R^6$ independently stand for an alkoxy group of 1 to 4 carbon atoms, a hydroxy group, an amino group, a vinyl group, a methacryloxy group, an epoxy group, or a carboxyl group and a stands for an integer in the range of 0 to 10).

$$F_3C-(CF_2)_a-(R^7)-Si-(OR^8)_3 \quad (E)$$

(wherein $R^7$ stands for an alkylene group of 1 to 4 carbon atoms, $R^8$ for an alkyl group of 1 to 4 carbon atoms, an alkoxyalkyl group, or an acyl group, and a for an integer in the range of 1 to 10).

The application of the silicon compound for the lubricating treatment mentioned above is generally attained by immersion. The heating of the applied layer is generally carried out at a temperature in the neighborhood of 100° C. for a period of 5 to 10 minutes, though variable with the kinds of the substrate and the kind of the lubircity-imparting agent to be used.

The antireflection solution and the method for treatment with the antireflection solution contemplated by the present invention are suitable for furnishing optical lenses (spectacles lenses and camera lenses), TV filers, and instrument covering lenses with a durable antireflection film by a process which comprises applying the antireflection solution by immersion and heating the applied layer of solution at a low temperature in the neighborhood of 100° C.

Now, the present invention will be described more specifically below with reference to referential examples, working examples, and conventional examples to demonstrate the effect of this invention.

<Referential examples>

(1) Conditions for hydrolysis
Regarding correlation between tetraalkoxy silane and water (acidity and amount of addition)
Hydrolysis of 93 g of tetraethyl ortho-silicate (product of Kishida Kagaku K.K.) as a tetraalkoxy silane was effected by refluxing the silane in methyl alcohol as a solvent, using as hydrolyzing water (occasionally referred to simply as "water" hereinafter) an aqueous solution containing hydrochloric acid of a varying concentration, 0, $10^{-3}$, $10^{-2}$, and 1N, in a varying amount, 23 g, 50 g, 100 g, 200 g, or 400 g. The refluxing time was fixed at 2 hours.

Conditions of treatment:
Substrate for treatment: A CR-39 sheet (7 cm×7 cm×2 mm)
Method of application: Immersion and lifting method (immersion time - 30 seconds, lifting speed 35 mm/minute, and bath temperature 10° C.)
Heating condition: 100° C.×one hour
Under the conditions mentioned above, the resultant hydrolyzate was applied on one half of the surface of the sheet and then dried. The film thus produced was tested for (1) reflected color, (2) transmittance, (3) appearance of film, and (4) shelf life of solution.

Method of test

1 Reflected color: The CR-39 sheet was held in hands at a distance of 30 cm from a table-top fluorescent lamp (15 W) and set at an angle fit for easy reflection of the light from the lamp. The reflected lights from the non-treated part and the treated part of the sheet were visually examined.

2 Transmittance: The transmittance of light of a wavelength of 550 nm in the non-treated part and the treated part was measured to determine the difference in reflectance.

$$\text{Transmittance (\%) in the treated part} \Big/ \text{Transmittance (\%) in the non-treated part}$$

3 Appearance of antireflection film: The film was visually examined to find possible effects (such as weeping) of application.

4 Shelf life of solution: The antireflection solution was left standing at room temperature for two weeks following the time of preparation to fine possible change of properties. (To be specific, a 250-ml sample of the solution was placed in a glass vial having an inner volume of 500 ml and left standing at normal room temperature, with the vial sealed with an inner lid and an outer lid.)

The results of the test are shown in Table 1.

The results of 2 regarding change of reflectance indicate that the acid concentration in the hydrolyzing water is required to fall in the range of 0 to 1N and the amount of the hydrolyzing water to be added in the range of 50 to 400 g, those of 3 regarding appearance of applied film (ease of application of solution) indicate that the amount of the hydrolyzing water is required to fall in the range of 23 to 200 g, and those of 4 regarding shelf life of solution indicate that the acid concentration is required to fall in the range of 0 to $10^{-2}$N. From the overall evaluation of the results of 1 to 4, it is concluded that the proper acid concentration of the hydrolyzing water and the proper amount of the hydrolyzing water to be added are respectively in the range of $10^{-3}$ to $10^{-2}$N and in the range of 100 to 200 g (equivalent to 12 to 25 mols). The amount of addition is permitted to fall in the range of 50 to 500 g (equivalent to 6.22 to 62.22 mols). Although the solution at this stage has not yet been converted into a colloid solution, it is effective in producing an antireflection film. The average film thickness is 0.5±0.1 μ.

(2) Conversion into colloid solution: regarding correlation between hydrolyzate and pH A hydrolyzate was obtained by continuously refluxing a mixture consisting of 93 g of tetraethyl ortho-silicate, 632 g of methyl alcohol, and 100 g of water (containing HCl in a concentration of $10^{-2}N$) for two hours. The silicon component residue was 3.2 wt%.

This hydrolyzate was prepared in a total of seven species having the pH value varied stepwise by a pitch of pH 1 between pH 2.0 and pH 7.0 (the pH adjustment by the use of acetic acid and aqua ammonia diluted with methanol). It was kept refluxed until it was converted into a colloid solution (indicated by opacification of solution). The results were evaluated with respect to pH vs. refluxing time, initial viscosity (after pH adjustment) and final viscosity (after reflux), and transparency (after reflux).

These test results are shown in Table 2.

When the hydrolysis was effected as pH 2, the solution kept transparency intact and viscosity sparingly impaired even after 144 hours' reflux. It is noted that the refluxing time preceding the phenomenon of opacification (due to conversion into a colloid solution) decreased in an accelerated manner as the pH value increased from pH 2. It is also seen that at a pH value exceeding 7, the solution was immediately gelled and the reaction was controlled with great difficulty. By the laser scattering method using an instrument (produced by colter Corp. of U.S. and marketed under trademark designation of "Colter $N_4A$"), the colloid solutions obtained by the hydrolysis at pH 3, pH 4, and pH 5 were found to contain colloid particles 10 to 50 nm in diameter.

(3) Preparation of solution

The colloid solution obtained in (2) above had viscosity so high that, at the time of application on a substrate, it entailed an adverse phenomenon of weeping and the produced film emitted an uneven reflected color (interference). Thus it had to be diluted with a proper solvent to preclude the adverse effects of weeping and interference color.

Samples, each 500 g, of the colloid solution obtained by the hydrolysis at pH 4 in (2) above were diluted with varying solvents indicated in Table 3, to obtain antireflection solutions.

Under the following conditions of treatment, these antireflection solutions were applied to CR-39 substrates prepared under the same conditions as used in (1) above, to obtain test pieces.

Conditions of treatment: Immersion and lifting method seconds, lifting speed 35 mm/2 minutes, and bath temperature 10° C.).

The test pieces consequently obtained were tested for film properties in the same manner as in (1) above.

The results of test are shown in Table 3. It is clearly noted from the results that, to acquire satisfactory coating property, the colloid solutions (500 g) required addition of 200 to 300 g of solvents.

<EXAMPLES>

Figure 2:
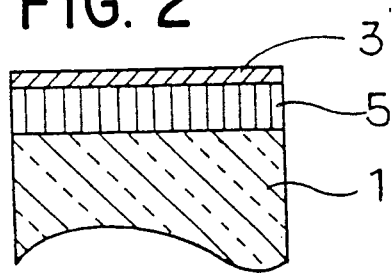
FIG. 2 is a cross section similarly illustrating in schematic form another article resulting from the treatment.
Figure 3:
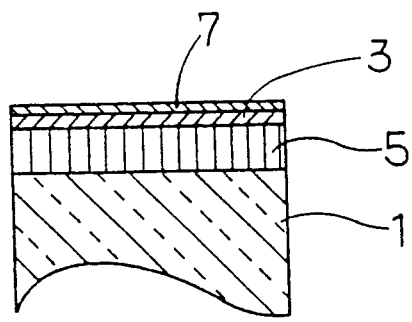
FIG. 3 is a cross section illustrating in schematic form yet another article resulting from the treatment.

FIGS. 1 to 3 are model diagrams of working examples resulting from the antireflection treatment; FIG. 1 corresponding to Examples 1 and 5, FIG. 2 corresponding to Examples 2, 3, and 6, and FIG. 3 corresponding to Examples 7 and 8. In the diagrams, 1 stands for a transparent substrate, 3 for an antireflection film, 5 for a hard coat, and 7 for a layer formed by lubricating treatment.

(1) EXAMPLE 1

The antireflection solution was prepared through the following steps of 1, 2, and 3.

1 Hydrolysis: A mixture consisting of 93 g of tetraethyl ortho-silicate, 632 g of methyl alcohol, and 100 g of water (containing hydrochloric acid in a concentration of $10^{-2}N$) was refluxed for hydrolysis for two hours.

2 Conversion into colloid solution: After completion of the hydrolysis of 1, the reaction solution was adjusted to pH 4 and refluxed again for 14 hours.

3 Preparation of solution: To 500 g of colloid, 500 g of isopropyl alcohol was added.

The antireflection solution thus prepared was applied to a glass sheet (30×30×0.2 cm) under the same conditions as used in the preceding referencial example and heated at 100° C. for one hour to effect an antireflection treatment.

(2) EXAMPLE 2

At room temperature, 1,000 parts by weight of the antireflection solution prepared in Example 1 and 60 parts by weight of the hydrolyzate of methyltrimethoxy silane (obtained by stirring 15 parts by weight of methyltrimethoxy silane, 30 parts by weight of methyl alcohol, and 15 parts by weight of water containing HCl in a concentration of $10^{-2}N$) were stirred for 24 hours. An antireflection solution was obtained by adding as a diluent 10 ml of a solution obtained by diluting a silicone type surfactant with isopropyl alcohol to a concentration of 10% to the resultant mixture.

A CR-39 (focal depth 0.00) lens having a hard coat (indicated in Example 17 of Japanese Patent No. 1,313,933) applied in advance thereto was coated with the antireflection solution by the immersion and lifting method (immersion time 30 seconds, lifting speed 100 mm/2.5 minutes, and bath temperature 10° C.). The applied layer of the solution was heated at 100° C. for one hour to effect an antireflection treatment.

(3) EXAMPLE 3

At room temperature, 1,000 parts by weight of the antireflection solution prepared in Example 1 and 60 parts by weight of the hydrolyzate of γ-glycidoxypropyltrimethoxy silane (obtained by stirring 15 parts by weight of γ-glycidoxypropyltrimethoxy silane, 30 parts by weight of methyl alcohol, and 15 parts by weight of water (containing hydrochloric acid in a concentration of $10^{-2}N$) were stirred for 24 hours. An antireflection solution was obtained by adding to the resultant mixture 10 ml of a solution obtained by diluting a fluorine type surfactant with methyl alcohol to a concentration of 10%. A PC sunglasses (injection molded product) furnished in advance with a hard coat (by the method indicated in Example 4 of Japanese Patent No. 1,313,933) were coated with the antireflection solution by the immersion and lifting method (immersion time 30 seconds, a lifting speed 120 mm/2.5 minutes, and a bath temperature 10° C.) and then heated at 110° C. for one hour to effect an antireflection treatment.

(4) EXAMPLE 4

At room temperature, 1,000 parts by weight of the antireflection solution prepared in Example 1 and 60 parts by weight of the hydrolyzate of vinyltrimethoxy silane (obtained by stirring 15 parts by weight of vinyltrimethoxy silane, 15 parts by weight of methyl alcohol, and 15 parts by weight of water containing hydrochloric acid in a concentration of $10^{-2}$N) were stirred for 24 hours. An antireflection solution was obtained by adding to the resultant mixture 10 ml of a solution obtained by diluting a fluorine type surfactant with ethyl cellosolve to a concentration. A glass sheet (30×30×0.2 cm) was coated with the antireflection solution by the immersion and lowering method (immersion time 30 seconds, lowering speed 100 mm/2.5 minutes, and bath temperature 10° C.) and heated at 120° C. for one hour to effect an antireflection treatment. Further, the coated glass was coated with the hydrolyzate of polyethoxydimethyl siloxane (obtained by stirring 5 parts by weight of polyethoxydimethyl siloxane produced by Nippon Unica K.K. and marketed under product code of "AZ6301," 900 parts by weight of isopropyl alcohol, and 5 parts by weight of water containing hydrochloric acid in a concentration of $10^{-2}$N and allowing the resultant mixture to stand at rest for 24 hours) by the immersion and lowering method (immersion time 30 seconds, lowering speed 100 mm/80 seconds, and bath temperature 10° C.), dried, and heated at 100° C. for five minutes to effect an antireflection treatment.

(5) EXAMPLE 5

A mixture consisting of 63 g of tetraethyl ortho-silicate, 632 g of methanol, 100 g of water (containing hydrochloric acid in a concentration of $10^{-2}$N), and 33 g of methanol silica gel (produced by Nissan Chemical Co., Ltd. solids content 30%) was continuously refluxed for two hours. The resultant hydrolyzate was adjusted to pH 5 and refluxed again for seven hours to effect conversion into a colloid solution. An antireflection solution was obtained by adding to the resultant colloid solution 200 g of isopropyl alcohol and 300 g of methyl alcohol.

A glass sheet (30×30×0.2 cm) was coated with the antireflection solution by the immersion and lifting method (immersion time 30 seconds, lifting speed 35 mm/minute, and bath temperature 10° C.) and then heated at 80° C. for two hours to effect an antireflection treatment.

(6) EXAMPLE 6

At room temperature, 1,000 parts by weight of the solution prepared in Example 5 and the hydrolyzate of γ-methacryloxypropyltrimethoxy silane (obtained by refluxing 30 parts by weight of γ-methacryloxypropyltrimethoxy silane, 60 parts by weight of methyl alcohol, and 105 parts by weight of water containing hydrochloric acid in a concentration of $10^{-2}$N) were stirred for 24 hours. An antireflection solution was obtained by adding to the resultant mixture 10 ml of a solution obtained by diluting a silicon type surfactant with methyl alcohol to a concentration of 10% and 2 parts by weight of acetylacetone aluminum as a catalyst. A PC lens (product of injection molding) furnished in advance with a hard coat (by the method indicated in Example 3 of Japanese Patent No. 1,313,932) by the spin coating method (rotational speed of 3,000 rpm), treated with a far infrared ray (by a panel heater produced by Jard and marketed under a trademark designation of "Infrajet SF") for five minutes, and then heated in an oven at 110° C. for two hours to effect an antireflection treatment.

(7) EXAMPLE 7

At room temperature, 1,000 parts by weight of the solution prepared in Example 5 and 105 parts by weight of the hydrolyzate of methyltrimethoxy silane (obtained by stirring 30 parts by weight of methyltrimethoxy silane, 60 parts by weight of methyl alcohol, and 15 parts by weight of water containing HCl in a concentration of $10^{-2}$N) were stirred for 24 hours. An antireflection solution was obtained by adding to the resultant mixture 10 ml of a solution obtained by diluting a fluorine type surfactant with isopropyl alcohol to a concentration of 10%.

A CR-39 (focal depth 0.00) 70-mm lens furnished in advance with a hard coat (by the method indicated in Example 17 of Japanese Patent No. 1,313,933) was coated with the antireflection solution by the immersion and lowering method (immersion time 30 seconds, lowering speed 100 mm/2.5 minutes, and bath temperature 10° C.) and heated at 100° C. for one hour to effect an antireflection treatment. Further, the coated lens was coated with analkoxy-modified silicone oil treating liquid [obtained by stirring 5 parts by weight of an alkoxy-modified silicone oil produced by Nippon Unika K.K. and marketed under product code of YH1587, 100 parts by weight of methylethyl ketone, and 600 parts by weight of Freonsolve (fluorine type detergent produced by Asahi Glass Company, Ltd.) and allowing the resultant mixture to stand at rest for 24 hours] by the immersion and lifting method (immersion time 30 seconds, lifting speed 100 mm/80 seconds, and bath temperature 10° C.) and then heated at 100° C. for five minutes to effect a lubricating treatment.

(8) EXAMPLE 8

A CR-39 lens was given the same antireflection treatment as in Example 7. The coated lens was coated by being left standing at room temperature for 24 hours in a stirred mixture consisting of 5 parts by weight of fluoroalkyl silane (produced by Toshiba Silicone K.K. and marketed under product code of XC95-470, 100 parts by weight of isopropyl alcohol, and 500 parts by weight of Reonsolve (fluorine type detergent produced by Asahi Glass Company, Ltd.) and then dried at 50° C. for five minutes to effect a lubricating treatment.

(9) CONVENTIONAL EXAMPLE 1

A treating solution prepared by adding 300 parts by weight of isopropyl alcohol to 33 parts by weight of colloidal silica dispersed in isopropyl alcohol (produced by Nissan Chemicals Industries, Ltd.; solids content 30%) was applied to a preparatorily washed flat CR-39 sheet in an amount calculated to give the eventually hardened film a thickness of 0.12 μm (optical film thickness 0.17 μm) by the immersion and lowering method (immersion time 30 seconds, lowering speed 100 mm/2 minutes, and bath temperature 10° C.) and treated in a hot-air drier at 120° C. for one hour.

(10) CONVENTIONAL EXAMPLE 2

A treating solution prepared by adding 300 parts of methyl alcohol to 40 parts of water-dispersed colloidal silica (produced by Nissan Chemicals Industries, Ltd. and marketed under trademark designation of "Snowtex S"; solids content 20%) was applied to a preparatorily washed flat CR-39 sheet in an amount calculated to give the eventually hardened film a thickness of 0.1 μm by the immersion and lowering method (immersion time 30 seconds, lowering speed 100 mm/2.5 minutes, and bath temperature 10° C.) and treated in a hot-air drier at 120° C. for one hour.

(11) CONVENTIONAL EXAMPLE 3

A treating solution obtained by stirring 15 parts by weight of tetraethyl ortho-silicate (produced by Kishida Kagaku K.K.), 90 parts by weight of iropropyl alcohol, 90 parts by weight of methyl alcohol, and 5 parts by weight of water containing HCl in a concentration of $10^{-2}$N thereby effecting hydrolysis was applied to a preparatorily washed flat CR-39 sheet in an amount calculated to give the eventually hardened film a thickness of 0.1 μm by the immersion lowering method (immersion time 30 seconds, lowering speed 100 mm/2.5 minutes, and bath temperature 10° C.) and treated in a hot-air drier at 120° C. for one hour.

(12) CONVENTIONAL EXAMPLE 4

The same treating solution as used in Conventional Example 1 was applied to a CR-39 (focal depth 0.00) 70-mm lens furnished in advance with a hard coat (by the method indicated in Example 17 of Japanese Patent No. 1,313,933) under the same conditions as used in Conventional Example 1.

(13) CONVENTIONAL EXAMPLE 5

The same treating solution as used in Conventional Example 2 was applied to PC (injection molded product) sunglasses furnished in advance with a hard coat (by the method indicated in Example 4 of Japanese Patent No. 1,313,933) under the same conditions as used in Conventional Example 2.

(14) CONVENTIONAL EXAMPLE 6

The same treating solution as used in Conventional Example 3 was applied to a CR-39 (focal depth 0.00) 70 mm lens furnished in advance with a hard coat (by the method indicated in Example 17 of Japanese Patent No. 1,313,933) under the same conditions as used in Conventional Example 3.

The antireflection films obtained in the working examples and the conventional examples described above were tested for the following film properties.

Method of testing film properties

1 Test for wear resistance

The surface of a sample was rubbed with steel wool, #0000, and the results were rated on the three-point scale, wherein:

A stands for substantial absence of scratch,

B for slight presence of scratches, and

C for conspicuous presence of scratches.

2 Test for resistance to hot water

A sample was immersed in boiling water for one hour. It was examined with respect to appearance and reflected color to find possible change before and after the immersion. The results were rated on the four-point scale, wherein:

A stands for absence of change in reflected color,

B for decrease of tint in reflected color,

C for change in reflected color, and

D for complete loss of reflected light.

3 Test for colorfastness - 1

In 100 parts of hot water kept at 92° C., 0.4 part of dye (produced by Mitsubishi Chemical Industries, Ltd. and marketed under product code of "Blue BGFS") and 0.4 part of a surfactant (produced by Nippon Senkakogyo K.K. and marketed under product code of "GNK-01") were stirred. In the resultant hot aqueous solution, a sample having the antireflection treatment performed on one half part thereof was immersed for 30 minutes. After the immersion, the sample was examined as to dyeability of the untreated part and the part coated with the antireflection film.

4 Test for colorfastness - 2

By the use of an ombre dyeing machine produced by Nippon Kogaku K.K., a sample having the antireflection treatment performed on the entire surface thereof was subjected to ombre dyeing (half dyeing) for 15 minutes to find dyeability of the sample.

5 Test for resistance to dyeing

A sample prepared under the same conditions as those involved in the test for dyeability - 2 was immersed in a dye following the procedure of Test for dyeability - 1 for two hours. After the immersion, the sample was examined to find possible change in reflected color.

6 Test for adhesiveness

In accordance with the method of JIS D-0202, a sample was incised with regularly spaced intersecting lines defining a total of 100 small squares of 1 mm within a square of 1 cm. An adhesive tape was applied fast to the incised surface of the sample and ripped off the surface. This procedure was carried out in a total of ten cycles. The adhesiveness of the film was reported by the number of small squares remaining on the surface after the last cycle.

7 Test for weatherability

In accordance with the method of JIS L-1096, a sample was exposed to outdoor conditions for 200 hours and 400 hours. At the end of each standing, the sample was examined to find possible change in reflected color or separation of film.

8 Test for antireflection property

By the use of a recording spectrophotometer (produced by Hitachi, Ltd. and marketed under product code of "U3400"), a sample having the antireflection treatment performed on one half part thereof was tested for transmittance of a light of a wavelength of 550 nm in the treated part and the untreated part. The results are shown in Table 4. It is noted from the results that the antireflection films produced in the working examples of this invention exhibited satisfactory film properties.

This invention accomplishes the heretofore hardly attainable improvement of the antireflection film in durability (resistance to heat and resistance to hot water). It imposes no limit upon the shape of a substrate subjected to coating and, therefore, provides the substrate with a necessary antireflection treatment inexpensively as compared with the conventional method resorting to vacuum deposition.

In the case of the vacuum deposition method heretofore used on spectacle lenses (made of CR-39), etc., the vacuum deposited film has the possibility of sustaining cracks, being dissolved, or inducing change or total loss of reflected color under the action of heat or hot water. Moreover, the treatment of vacuum deposition deprives plastic substrates of the dyeability inherently possessed thereby.

In contrast, the present invention provides a given substrate with an antireflection film such that the substrate can be dyed even across the film and, therefore, meets the needs of the users' extensively. Since the treatment by the method of this invention is inexpensive, it can be applied effectively to cover lenses for measuring instruments and various optical filters.

TABLE 1

| Amount of water added | | Concentration of hydrochloric acid (N) | | | |
|---|---|---|---|---|---|
| | | 0 | $10^{-3}$ | $10^{-2}$ | 1 |
| 23 g | 1 | Colorless | Colorless | Colorless | Colorless |
| | 2 | 93/92 | 93/92 | 93/92 | 93/92 |
| | 3 | Good | Good | Good | Good |
| | 4 | Good | Good | Good | Good |
| 50 g | 1 | Colorless | Colorless | Colorless | Light pink |
| | 2 | 93/92 | 93/91.5 | 93/92 | 94/92 |
| | 3 | Good | Good | Good | Good |
| | 4 | Good | Good | Good | Increased viscosity |
| 100 g | 1 | Colorless | Light pink | Light pink | Light pink |
| | 2 | 93/92 | 94/92 | 94/92 | 94/91.5 |
| | 3 | Uneven color | Good | Good | Good |
| | 4 | Good | Good | Good | Increased viscosity |
| 200 g | 1 | Colorless | Light pink | Light pink | Light pink |
| | 2 | 93/91.5 | 94/92 | 94/91.5 | 94/92 |
| | 3 | Uneven color | Good | Good | Uneven color |
| | 4 | Good | Good | Good | Increased viscosity |
| 400 g | 1 | Light pink | Light pink | Light pink | Light pink |
| | 2 | 94/92 | 94/92 | 94/92 | 94/92 |
| | 3 | Uneven color | Uneven color | Uneven color | Uneven color |
| | 4 | Increased viscosity | Increased viscosity | Increased viscosity | Increased viscosity |

TABLE 2

| | PH | | | | | |
|---|---|---|---|---|---|---|
| | 2 | 3 | 4 | 5 | 6 | 7 |
| Refluxing time (hr) | 144 | 72≧ | 14≧ | 6≧ | 1≧ | 0.1≧ |
| Viscosity Initial stage | 2.1 | 2.1 | 2.3 | 2.5 | 2.9 | 3.4 |
| Final stage | 2.5 | 4.5 | 5.1 | 5.1 | 6.2 | Gelled |
| Transparency | Clear | 15 cm | 10 cm | 11 cm | 8 cm | |

Viscosity: Measured with a viscosimeter, B type (produced by Tokyo Keiki K.K.) at 25° C.
Initial stage - After pH adjustment
Final stage - After refluxing
Transparency: Measured in accordance with the method of JIS K-0101. The end point of refluxing was decided by the degree of transparency of about 10 cm.

TABLE 3

| Solvent | | Amount added | | | |
|---|---|---|---|---|---|
| | | 100 g | 300 g | 500 g | 1000 g |
| Isopropyl alcohol | Interference Color | Yellow to magenta | Magenta | Light magenta | Yellow |
| | Transmittance | 97% | 98% | 98% | 97% |
| | Weeping | Peripheral weeping | Good | Good | Good |
| Ethyl cellosolve | Interference color | Yellow, green, magenta | Green magenta | Light yellow | Colorless |
| | Transmittance | 97% | 96% | 94% | 94% |
| | Weeping | Peripheral weeping | Peripheral weeping | Good | Good |
| Methyl alcohol | Interference color | Uneven stepwise (upper and lower sides) | Uneven stepwise (upper and lower sides) | Magenta | Light yellow |
| | Transmittance | 97% | 98% | 98% | 97% |
| | Weeping | Peripheral weeping | Good | Good | Good |
| Methylethyl ketone | Interference color | Magenta | Magenta | Yellow | Light Yellow |
| | Transmittance | 97% | 98% | 98% | 97% |
| | Weeping | Peripheral weeping | Uneven stepwise | Good | Good |

TABLE 4

| | Example 1 | Example 2 | Example 3 | Example 4 | Example 5 | Example 6 | Example 7 | Example 8 |
|---|---|---|---|---|---|---|---|---|
| 1 | A | A | A | A | A | B | A | A |
| 2 | A | A | B | A | A | A | A | A |
| 3 | | 34%/34% | 26%/26% | | | 26%/26% | 34%/34% | 34%/34% |
| 4 | | Pretty ombre dyeing | Pretty ombre dyeing | | | Pretty ombre dyeing | Pretty ombre dyeing | Pretty ombre dyeing |
| 5 | | No change | Slightly light | | | Slightly light | No change | No change |
| 6 | 100/100 | 100/100 | 100/100 | 100/100 | 100/100 | 100/100 | 100/100 | 100/100 |
| 7 | 200 Hs | No change | No change | No change | No change | No change | No change | No change |
| | 400 Hs | No change | " | " | " | " | " | " |

TABLE 4-continued

| | Example 1 | Example 2 | Example 3 | Example 4 | Example 5 | Example 6 | Example 7 | Example 8 |
|---|---|---|---|---|---|---|---|---|
| 8 | 98% | 98% | 97.5% | 98% | 98% | 97.5% | 98.4% | 98.2% |

TABLE 5

| | Conventional Example 1 | Conventional Example 2 | Conventional Example 3 | Conventional Example 4 | Conventional Example 5 | Conventional Example 6 |
|---|---|---|---|---|---|---|
| 1 | C | C | B | C | C | B |
| 2 | D | D | D | D | D | D |
| 3 | | | | | | |
| 4 | | | | | | |
| 5 | | | | | | |
| 6 | 0/100 | 0/100 | 100/100 | 0/100 | 0/100 | 100/100 |
| 7 200 Hs | Anti-reflection film separated | Anti-reflection film separated | Anti-reflection film cracked | Anti-reflection film separated | Anti-reflection film separated | Anti-reflection film cracked |
| 400 Hs | | | | | | |
| 8 | 96.5% | 96.0% | 94.0% | 96.0% | 95.7% | 93.8% |

Regarding test results of ③, ④, and ⑤:
In Conventional Examples 1, 2, 4, and 5, the antireflection films were separated from the substrates and were incapable of measurement.
In Conventional Examples 3 and 6, the antireflection films sustained cracks and were incapable of measurement.

What is claimed is:

1. A solution for making an optical part non-reflecting comprising:
  a) a hydrolytic derivative of a silicic ester of the formula $Si(OR)_4$, wherein R is an alkyl group of 1 to 4 carbon atoms, an alkoxyalkyl group or an acyl group, said hydrolytic derivative having been obtained by hydrolyzing 1 mole of the silicic ester with 5-60 mols of water in the presence of a solvent compatible with both the silicic ester and water to form a hydrolyzate and heating the hydrolyzate at a pH of 3-7;
  b) a hydrolyzate of a silicon compound of the formula $$R_a^1-\underset{\underset{R_b^2}{|}}{Si}(OR^3)_{4-a-b}$$

wherein $R^1$ is an alkyl group of 1 to 6 carbon atoms, a vinyl group, an epoxy group, a methacryloxy group or a phenyl group; $R^2$ is an alkyl group of 1 to 6 carbon atoms or a halogenated alkyl group; $R^3$ is an alkyl group of 1 to 4 carbon atoms, an alkoxyalkyl group or an acyl group; and a and b each are 0, 1, or 2, provided that a+b is 1, 2, or 3; and
  c) colloidal silica.

2. A method for making an optical part non-reflecting which comprises contacting the surface of the optical part with a solution comprising:
  a) a hydrolytic derivative of a silicic ester of the formula $Si(OR)_4$, wherein R is an alkyl group of 1 to 4 carbon atoms, an alkoxyalkyl group or an acyl group, said hydrolytic derivative having been obtained by hydrolyzing 1 mole of the silicic ester with 5-60 moles of water in the presence of a solvent compatible with the silicic ester and water to form a hydrolyzate and heating the hydrolyzate at a pH of 3-7;
  b) a hydrolyzate of a silicon compound of the formula $$R_a^1-\underset{\underset{R_b^2}{|}}{Si}(OR^3)_{4-a-b}$$

wherein $R^1$ is an alkyl group of 1 to 6 carbon atoms, a vinyl group, an epoxy group, a methacryloxy group or a phenyl group; $R^2$ is an alkyl group of 1 to 6 carbon atoms or a halogenated alkyl group; $R^3$ is an alkyl group of 1 to 4 carbon atoms, an alkoxyalkyl group or an acyl group; and a and b each are 0, 1, or 2, provided that a+b is 1, 2 or 3; and
  c) colloidal silica;
and heating the solution to form a non-reflecting film on the surface of the optical part.

3. A method according to claim 2, comprising the additional step of treating the non-reflecting film with a solution containing a silicon compound of the formula $$Si_aO_{a-1}\left[\underset{\underset{CH_3}{|}}{\overset{\overset{CH_3}{|}}{(OSi)_b}}OR^4\right]_{2a+2}$$

wherein $R^4$ is an alkyl group of 1 to 4 carbon atoms, an alkyoxyalkyl group; or an acyl group; a is an integer of 1 to 4; and b is an integer of 1 to 7;

$$R^5-\underset{\underset{CH_3}{|}}{\overset{\overset{CH_3}{|}}{Si}}-O(\underset{\underset{CH_3}{|}}{\overset{\overset{CH_3}{|}}{Si}}-O)_a R^6$$

wherein $R^5$ and $R^6$ are each an alkoxy group of 1 to 4 carbon atoms, a hydroxyl group, an amino group, a vinyl group, a methacryloxy group, an epoxy group or a carboxyl group; and a is an integer of 0 to 10; or $$F_3C-(CF_2)_a-(R^7)-Si-(OR^8)_3$$

wherein $R^7$ is an alkylene group of 1 to 4 carbon atoms; $R^8$ is an alkyl group of 1 to 4 carbon atoms, an alkoxyalkyl group or an acyl group; and a is an integer of 1 to 10.

4. A method according to claim 2, wherein the optical part is made of a transparent plastic material selected from the group consisting of polydiethylene glycol bisallyl carbonate, polymethylmethacrylate and polycarbonate hard coated with a polysiloxane, an acrylic polymer, a melamine polymer, a polyester or a polyurethane.

5. A method according to claim 2, wherein the optical part is made of an inorganic glass.

* * * * *